United States Patent [19]
Ohta et al.

[11] Patent Number: 6,011,869
[45] Date of Patent: Jan. 4, 2000

[54] METHOD AND APPARATUS OF DECODING MOVING IMAGE

[75] Inventors: Mitsuhiko Ohta; Katsuki Miyawaki; Masanori Ishizuka, all of Kawasaki; Tadayoshi Kono; Hirohiko Inagaki, both of Yokohama, all of Japan

[73] Assignee: Fujitsu Limited, Tokyo, Japan

[21] Appl. No.: 09/017,671

[22] Filed: Feb. 3, 1998

[30] Foreign Application Priority Data

Jun. 20, 1997 [JP] Japan ................................ 9-164587

[51] Int. Cl.[7] ...................................................... G06K 9/36
[52] U.S. Cl. ............................................................ 382/233
[58] Field of Search ................................... 382/233, 236, 382/232, 307; 348/416, 415

[56] References Cited

U.S. PATENT DOCUMENTS

| | | | |
|---|---|---|---|
| 4,731,646 | 3/1988 | Kliem | 348/393 |
| 5,107,345 | 4/1992 | Lee | 382/232 |
| 5,598,215 | 1/1997 | Watanabe | 348/416 |
| 5,937,095 | 8/1999 | Machida | 382/233 |

*Primary Examiner*—Yon J. Couso
*Attorney, Agent, or Firm*—Staas & Halsey LLP

[57] ABSTRACT

In storing decoded image data of a picture into a memory 23, PTS1 and a valid/invalid flag F1 corresponding to the picture are stored at the top boundary address ADR1 of a storage area within the memory 23, ADR1 is temporarily held in a register circuit 211. whether a read address ADR coincides with any one of addresses ADR1 to ADR3 within the register circuit 211 is detected while sequentially reading data from the memory 23 to display a picture. When coincidence is detected, the data read from the memory 23 are retrieved as PTS and F, and control corresponding to a time difference between STC and retrieved PTS is executed if F indicates validity. When coincidence is not detected, the data read from the memory 23 are used as display decoded image data DAT4.

8 Claims, 4 Drawing Sheets

METHOD AND APPARATUS OF DECODING MOVING IMAGE

BACKGROUND OF THE INVENTION

1. Field of the Invention

The present invention relates to a method and an apparatus of decoding a moving image which is encoded according to the MPEG standard.

2. Description of the Related Art

The MPEG standard uses a system time clock STC, and a presentation time stamp PTS added to image and sound data, in order to reproduce the image and the sound with synchronizing them.

A moving image decoder according to the MPEG standard predicts a time difference between a decoding start point at which encoded image data are read from a buffer memory and a read start point at which display decoded image data are read from a frame memory, and adds the predicted time to STC, thereby performing processing which corresponds to a shift of PTS from STC at the decoding start point. When absolute value of such a shift is equal to or longer than a display period for displaying one frame (i.e., one picture), for instance, the moving image decoder repeats or skips a display image of one frame. However, in variable schedule processing, since such a time shift varies depending on a decoding time of one frame or other factors, the predicted time includes an error, which in turn makes it impossible to perform processing which corresponds to an accurate shift of PTS from STC.

SUMMARY OF THE INVENTION

Accordingly, an object of the present invention is to provide a method and an apparatus of decoding a moving image which have a simple structure and is possible to execute a process corresponding to an accurate shift of a presentation time stamp PTS from a system time clock STC.

In the 1st aspect of the present invention, there is provided a moving image decoder for decoding encoded image data to obtain decoded image data, temporarily storing the decoded image data into a memory and reading the decoded image data as display decoded image data from the memory in order of original pictures before encoding, comprising: a first register circuit for temporarily holding a boundary address of a picture storage area within the memory; a comparator circuit for detecting coincidence of a read address at which the display decoded image data is read with the boundary address; storage means for storing a presentation time stamp PTS and valid/invalid data in correspondence with the boundary address; a switching circuit for retrieving the presentation time stamp PTS and the valid/invalid data in response to detection of the coincidence; and a time difference adjusting circuit for performing control which corresponds to a time difference between a system time clock STC and the presentation time stamp PTS retrived by the switching circuit if the valid/invalid data indicates validity.

According to the 1st aspect of the present invention, since the time when the PTS is obtained from the switching circuit is substantially the same as the time when a picture corresponding to this PTS is started to display, the shift of PTS from STC is judged at correct timing without considering a time difference between decoding start point at which data are read from the memory and a read start point at which display decoded image data are read from the memory, and therefore, erroneous execution of the repeat/skip processing or the like can be prevented.

In addition, since the register circuit needs to comprise only three registers in general for the purpose of storing top boundary addresses, the circuit structure using this can be simplified.

In the 2nd aspect of the present invention, there is provided a moving image decoder as defined in the 1st aspect, wherein the storage means comprises a storage area at the boundary address within the memory.

According to the 2nd aspect of the present invention, a special register for storing PTS and valid/invalid data is not necessary.

In the 3rd aspect of the present invention, there is provided a moving image decoder as defined in the 2nd aspect, wherein the switching circuit comprises a multiplexer which receives data read from the memory, provides the received data as the presentation time stamp PTS and the valid/invalid data from its output when the coincidence is detected, and provides the received data as the display decoded image data from its another output when the coincidence is not detected.

In the 4th aspect of the present invention, there is provided a moving image decoder as defined in the 1st aspect, wherein the storage means comprises a second register circuit, and wherein the boundary address is a top address of a picture within the memory.

In the 5th aspect of the present invention, there is provided a moving image decoder as defined in the 4th aspect, wherein the switching circuit comprises a multiplexer which receives the presentation time stamp PTS and the valid/invalid data read from the second register circuit, and selectively outputs the presentation time stamp PTS and the valid/invalid data which correspond to the coincidence.

In the 6th aspect of the present invention, there is provided a moving image decoder as defined in the 1st aspect, wherein the time difference adjusting circuit outputs a control signal for causing to execute repeating that the display decoded image data of a picture read from the memory last time are read from the memory once again when PTS<STC+T0 where PTS is the presentation time stamp, STC is the system time clock and T0 is a display period for displaying one frame, and the time difference adjusting circuit outputs a control signal for causing to skip the encoded image data to be read from the memory by one frame when PTS<STC−T0.

In the 7th aspect of the present invention, there is provided a moving image decoding method for decoding encoded image data to obtain decoded image data, temporarily storing the decoded image data into a memory and reading the decoded image data as display decoded image data from the memory in order of original pictures before encoding, comprising the steps of: providing a register circuit; in storing the decoded image data of a picture into the memory, storing a presentation time stamp PTS and valid/invalid data which correspond to the picture at a boundary address of a picture storage area within the memory, and temporarily holding the boundary address into the register circuit; in sequentially reading the display decoded image data from the memory, detecting coincidence of a read address with the boundary address held in the register circuit; and retriving the data read from the memory as the presentation time stamp PTS and the valid/invalid data when the coincidence has been detected and controlling in correspondence to a time difference between a system time clock STC and the presentation time stamp PTS retrieved if the valid/invalid data indicates validity, and using the retrived data read from the memory as the display decoded image data while the coincidence is not detected.

In the 8th aspect of the present invention, there is provided a moving image decoding method for decoding encoded image data to obtain decoded image data, temporarily storing the decoded image data into a memory and reading the decoded image data as display decoded image data from the memory in order of original pictures before encoding, comprising the steps of: providing a register circuit; before reading the decoded image data of a picture from the memory, temporarily holding a presentation time stamp PTS and valid/invalid data which correspond to the picture and a boundary address of the picture within the memory into the register circuit; in sequentially reading the display decoded image data from the memory, detecting coincidence of a read address with the boundary address held in the register circuit; and when the coincidence has been detected, retriving the presentation time stamp PTS and the valid/invalid data which correspond to the coincidence from the register circuit and controlling in correspondence to a time difference between a system time clock STC and the presentation time stamp PTS retrieved if the valid/invalid data indicates validity.

DESCRIPTION OF THE PREFERRED EMBODIMENTS

Figure 1:
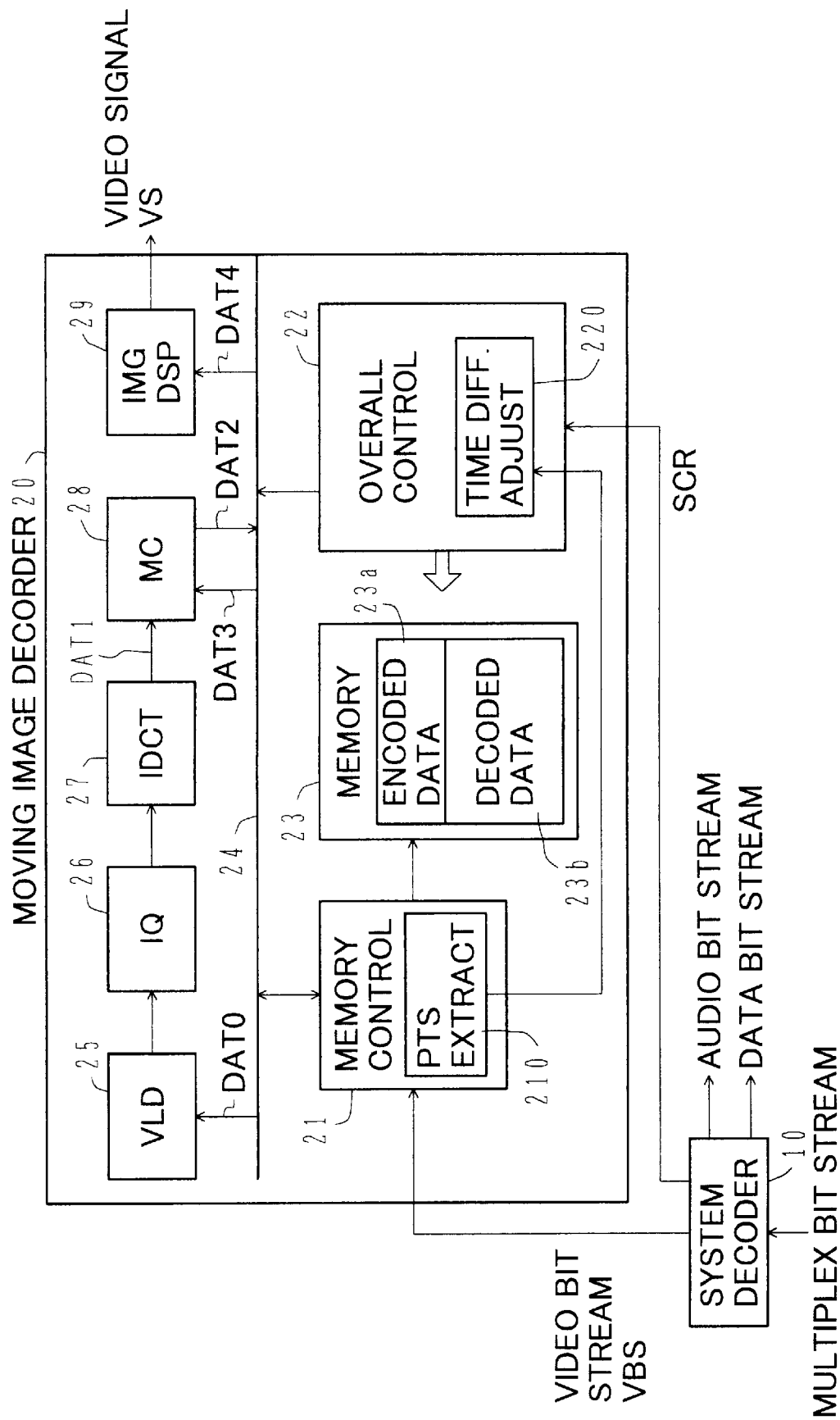
FIG. 1 is a block diagram schematically showing a structure of a moving image decoder according to a first embodiment of the present invention.

Referring now to the drawings, wherein like reference characters designate like or corresponding parts throughout several views, preferred embodiments of the present inventions will be described below.

First Embodiment

FIG. 1 is a block diagram showing a schematic structure of a system decoder 10 with a moving image decoder 20.

In a multiplex bit stream according to the MPEG standard, a video bit stream VBS, an audio bit stream and a data bit stream which are encoded are multiplexed and packed. One pack has a pack header and a plurality of packets. A pack header contains information such as a system clock reference SCR, while a packet header contains information such as a stream ID and a presentation time stamp PTS. PTS is not always included in every packet header.

Such a multiplex bit stream is provided to a system decoder 10, so that the information such as the system clock reference SCR, the stream ID and the presentation time stamp PTS is separated, and in accordance with the stream ID the multiplex bit stream is separated into the video bit stream VBS, the audio bit stream and the data bit stream.

VBS is provided to a memory control circuit 21 of a moving image decoder 20, while SCR and PTS are provided to a overall control circuit 22 of the moving image decoder 20. The overall control circuit 22, for instance using a digital PLL circuit, generates a system time clock STC, which is continuous, based on SCR which is discontinuous.

In the moving image decoder 20, in accordance with instructions given from the overall control circuit 22, the memory control circuit 21 stores the video bit stream VBS temporarily in an encoded data area 23a of a memory 23 at a high speed. The data within the area 23a are read at a slower speed than when stored, and provided as encoded image data DAT0 through a memory bus 24 to a variable length decoding circuit 25. The DAT0 is converted into a quantization DCT coefficient by the variable length decoding circuit 25, further converted into a DCT coefficient by an inverse quantizer circuit 26, and thereafter converted into image data DAT1 by an inverse DCT circuit 27.

When the DAT1 is of an I-picture (intra coded picture), the DAT1 passes through a motion compensation circuit 28 which includes a predictive decoding circuit without being processed, and through the memory bus 24 and the memory control circuit 21, is stored in a decoded data storage area 23b of the memory 23 as decoded image data DAT2. When the DAT1 is of a P-picture (predictive coded picture) or a B-picture (bi-directional predictive coded picture), in accordance with a picture type and a motion vector separated at the variable length decoding circuit 25, the memory control circuit 21 reads reference decoded image data from the decoded data storage area 23b of the memory 23 and provides the data to the motion compensation circuit 28 as DAT3. A predictive image is generated from the data DAT3, and the image data DAT1 are added to the data DAT3 so that the decoded image data DAT2 are generated. The decoded image data DAT2 are then stored in the decoded data storage area 23b through the memory bus 24 and the memory control circuit 21.

The data within the decoded data storage area 23b are read by the memory control circuit 21 in the order of pictures as they are before encoded, namely in the order of original picture, provided to an image display circuit 29 as display decoded image data DAT4 through the memory bus 24, and format-converted and converted into analog signal, whereby a video signal VS is generated.

Figure 2:
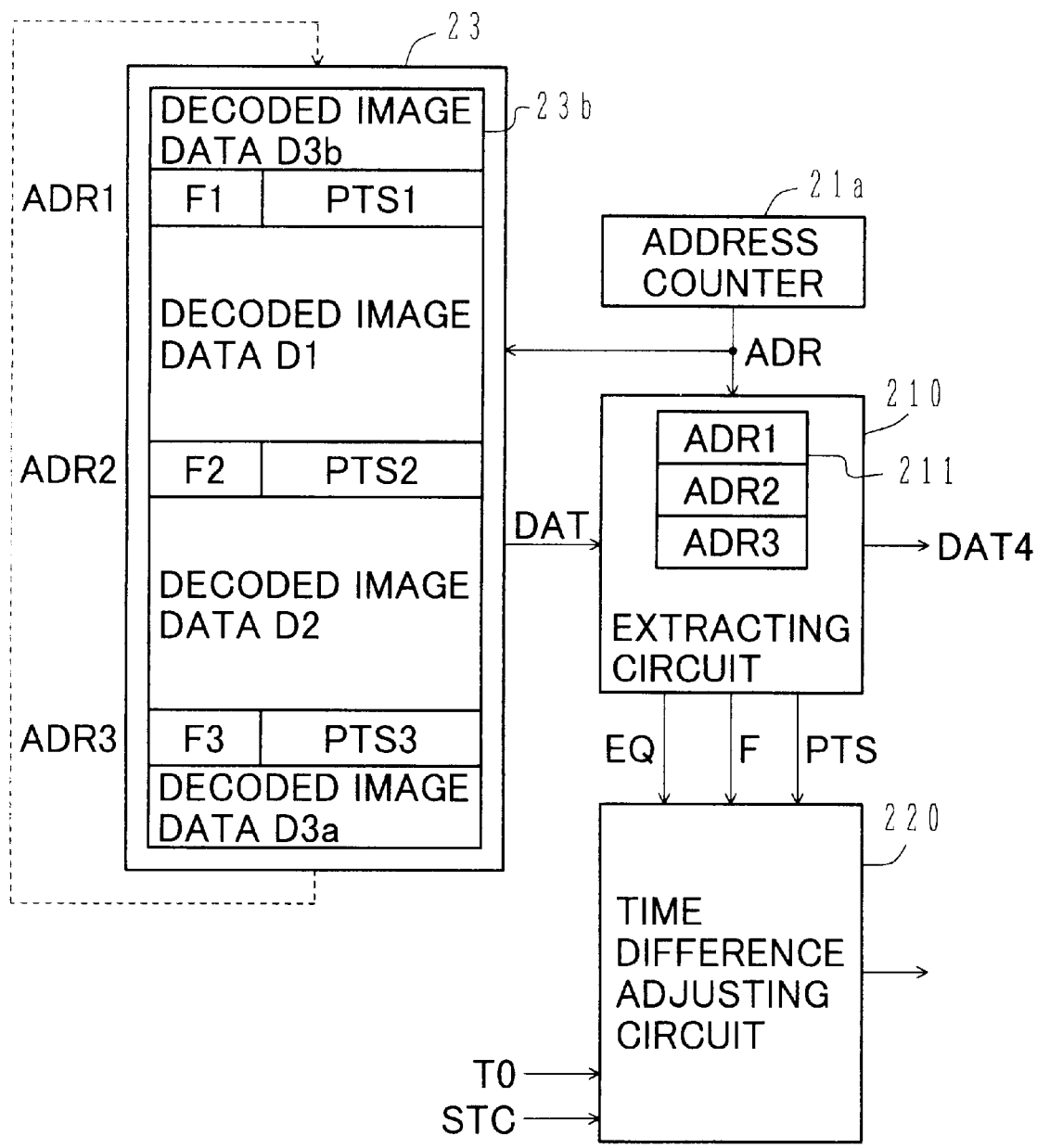
FIG. 2 is a block diagram showing a characteristic portion of the decoder shown in FIG. 1.

Characterized portions of the present invention are a PTS extracting circuit 210 within the memory control circuit 21, a time difference adjusting circuit 220 within the overall control circuit 22, and an arrangement of data within the decoded data storage area 23b of the memory 23. FIG. 2 shows these characterized portions.

Once stored, a B-picture within the decoded data storage area 23b is read as the display decoded image data DAT4 after a buffering time without being referred to, and therefore, takes up a memory area which is equal to or smaller than one frame. The decoded data storage area 23b has a memory capacity of, for instance, 2.5 frames which is the sum of two frames for a reference image and a half flame for a B-picture. How many frames the memory capacity of the decoded data storage area 23b has is dependent on a display mode, or the number of pixels contained in one frame.

Next to the last address of the decoded data storage area 23b is the first address of the decoded data storage area 23b. In FIG. 2, an area for decoded image data D3a and an area for decoded image data D3b are for one picture. For example, decoded image data D1 and D2 are of either an I-picture or a P-picture, and decoded image data (D3a+D3b) are of a B-picture. A valid/invalid flag F and a presentation time stamp PTS are stored immediately before the area for each one of the decoded image data D1, D2 and D3a. The flag F is the most significant bit of one word and PTS is a portion other than this bit, for instance. The data (F, PTS) which correspond to the decoded image data D1, D2 and (D3a+D3b) are denoted as (F1, PTS1), (F2, PTS2) and (F3, PTS3), respectively, which are stored at the top boundary addresses ADR1, ADR2 and ADR3, respectively, of one image storage area in the memory 23 as shown in FIG. 2.

Storing and reading of encoded image data in and from the memory 23, storing of decoded image data in the memory 23, reading of reference decoded image data from the memory 23, and reading of display decoded image data from the memory 23 are executed as time sharing for parallely processing. An address counter 21a shown in FIG. 2 is included in the memory control circuit 21 of FIG. 1, and serves as addressing a read display image data. In addition, the memory control circuit 21 comprises address counters not shown for storing encoded image data, reading encoded image data, storing decoded image data, and reading reference decoded image data, and switches these address counters.

When receiving PTS and so on from the system decoder 10, the overall control circuit 22 determines as F="1" if PTS have been received, but if PTS have not been received, as F="0" and holds PTS to an optional value, e.g., a previous value or 0. In storing the decoded image data DAT2 in the area 23b in accordance with an instruction from the overall control circuit 22, first, the memory control circuit 21 receives such a top boundary address above, and a flag F and PTS which correspond to a picture of the data DAT2 from the overall control circuit 22, thereafter loads the top boundary address in the address counter for storing decoded image data to thereby store F and PTS in the memory 23, and stores the top boundary address in an empty register of a register circuit 211, thereby storing the decoded image data DAT2 in order in the area 23b while incrementing the address by providing a clock to the address counter.

When the memory control circuit 21 reads the display decoded image data DAT4 from the decoded data storage area 23b in accordance with an instruction from the overall control circuit 22, for example reads the decoded image data D1 as the display decoded image data DAT4. The area for the decoded image data D1 becomes an empty area as reading of the decoded image data D1 is completed. When a B-picture is subsequently stored in this area, half the frame is used. Meanwhile, the memory control circuit 21 reads the decoded image data D2 as DAT4, their area becomes empty and the location of the top boundary address ADR2 shifts to an address which is next to the last address of that B-picture. The values of the top boundary addresses ADR1 to ADR3 are different depending on the number of pixels contained in one frame as well. Hence, the top boundary addresses ADR1 to ADR3 are not always constant.

When data DAT are read from the address ADR of the memory 23 to display an image, the PTS extracting circuit 210 compares the address ADR with the contents of the register circuit 211. The PTS extracting circuit 210 determines that the data DAT are F and PTS if the comparison indicate a coincidence, and provides F, PTS and a coincident signal EQ to the time difference adjusting circuit 220. Otherwise, the PTS extracting circuit 210 provides the data DAT to the image display circuit 29 of FIG. 1 as the display decoded image data DAT4.

When EQ="1" and F="1," the time difference adjusting circuit 220 adjusts a time difference in the following manner. That is, when PTS>STC+T0, the time difference adjusting circuit 220 outputs to the memory control circuit 21 a control signal which instructs to execute repeating that the display decoded image data DAT4 of a frame which was read from the memory 23 last time are read once again, where T0 is a display period for displaying one frame. When PTS<STC−T0, the time difference adjusting circuit 220 outputs to the memory control circuit 21 a control signal which instructs to skip encoded image data DAT0, which are provided from the decoded data storage area 23b to the variable length decoding circuit 25, by one frame.

Figure 3:
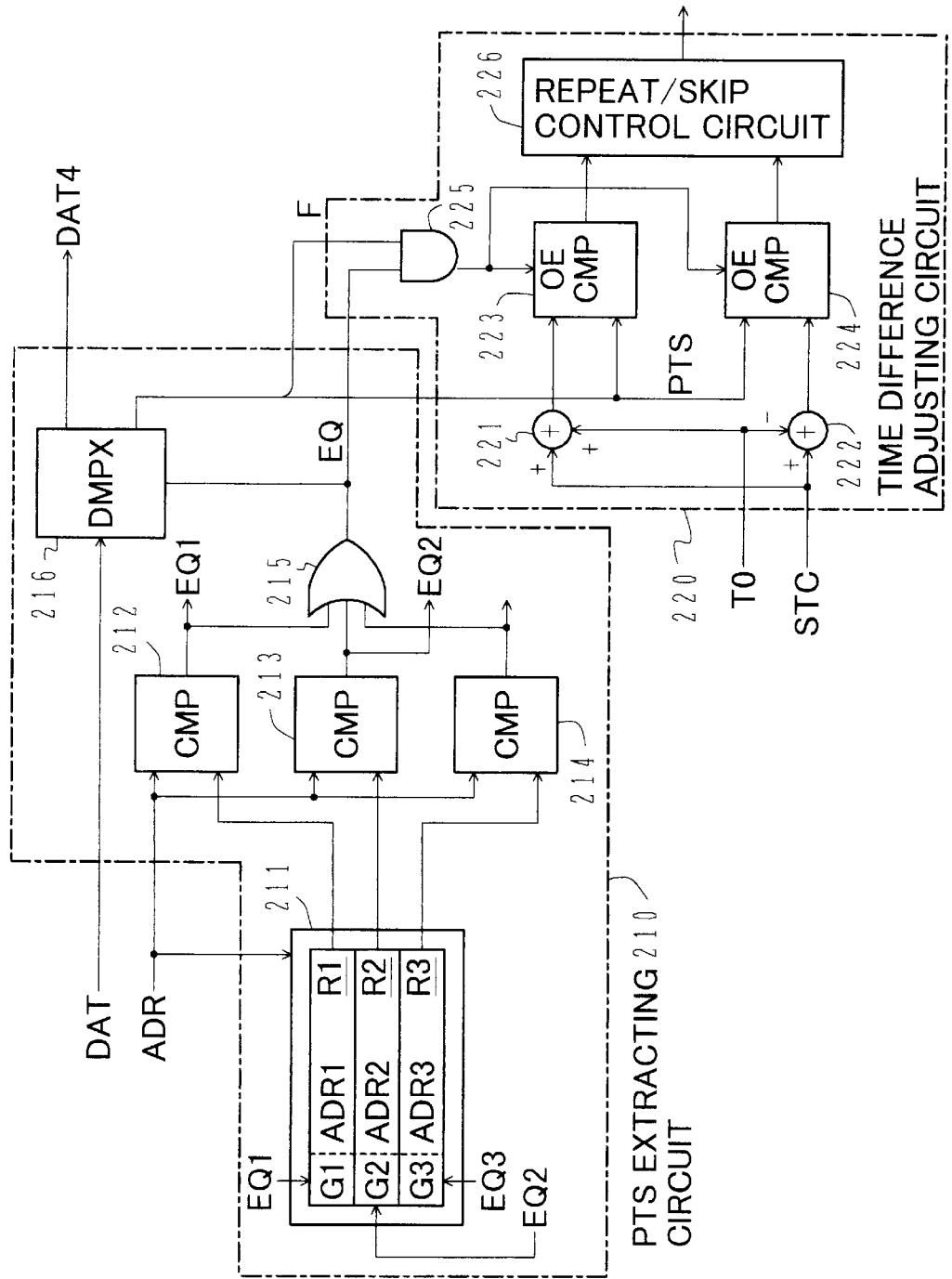
FIG. 3 is a diagram showing an example of structures of a PTS extracting circuit and a time difference adjusting circuit which are shown in FIG. 2.

FIG. 3 shows an example of structures of the PTS extracting circuit 210 and the time difference adjusting circuit 220 in FIG. 2.

Registers R1 to R3 of the register circuit 211 respectively hold pairs of flags G1 to G3, which are the most significant bits, and the top boundary addresses ADR1 to ADR3, which are portions except for these most significant bits. Among the contents of the registers R1 to R3, the top boundary addresses ADR1 to ADR3 are provided to one input of comparator circuits 212 to 214. The address ADR for reading display decoded image data from the address counter 21a of FIG. 2 are provided to the other input of the comparator circuits 212 to 214. Coincident signals EQ1 to EQ3, which are outputs from the comparator circuits 212 to 214, are provided to an OR gate 215. When it is judged that any two inputs of the comparator circuits 212 to 214 coincide with each other, the coincident signal EQ outputted from the OR gate 215 becomes "1." With regard to any i among 1 to 3, when EQi becomes "1", the memory control circuit 21 of FIG. 1 resets a flag Gi to "0" to mark a registor Ri as empty. At the time when a top boundary address ADRi is provided as described above, the memory control circuit 21 make the empty register Ri hold ADRi and sets the flag Gi to "1."

The coincident signal EQ is provided to a control input of a demultiplexer 216. The demultiplexer 216 outputs the data DAT as the display decoded image data DAT4 when EQ="0" but outputs the data DAT as the valid/invalid flag F and PTS when EQ="1."

In the time difference adjusting circuit 220, the system time clock STC is provided to one input of an adder circuit 221 and a non-inverting input of a subtracter circuit 222, while T0 is provided to the other input of the adder circuit 221 and an inverting input of the subtracter circuit 222. Outputs STC+T0 and STC−T0 from the adder circuit 221 and the subtracter circuit 222 are provided to one input of comparator circuits 223 and 224, respectively. PTS from the demultiplexer 216 is provided to the other input of the comparator circuits 223 and 224. An output from an AND gate 225 is provided to output enable signal input OE of the comparator circuits 223 and 224. To one and the other inputs of the AND gate 225 respectively, the coincident signal EQ and the valid/invalid flag F are provided.

When an output from the AND gate 225 is "0," i.e., when the coincident signal EQ or the valid/invalid flag F is "0," outputs from the comparator circuits 223 and 224 are both "0" regardless of values of inputs to the comparator circuits 223 and 224. When an output from the AND gate 225 is "1," that is, EQ and F are both "1," the comparator circuit 223 outputs "1" if PTS>STC+T0 holds but outputs "0" if not, while the comparator circuit 224 outputs "1" if PTS<STC−T0 holds but outputs "0" if not.

A repeat/skip control circuit 226 outputs the control signal for repeating described above when an output from the comparator circuit 223 is "1," and outputs the control signal for skipping described above when an output from the comparator circuit 224 is "1."

In this first embodiment, the valid/invalid flag F and presentation time stamp PTS are stored immediately before each picture within the decoded data storage area 23b, PTS is detected when the display decoded image data DAT4 are read from the area 23b, and processing corresponding to a shift of PTS from the system time clock STC is performed if F="1" when PTS is detected. Hence, the shift of PTS from STC is judged at correct timing without considering a time difference between decoding start point at which data are read from the encoded data area 23a and a read start point at which display decoded image data are read from the decoded data storage area 23b, and therefore, erroneous execution of the repeat/skip processing is prevented.

Further, since only the three registers R1 to R3 may be used as the addresses for storing PTS, the structure of the PTS extracting circuit 210 using these registers can be simplified.

Second Embodiment

Figure 4:
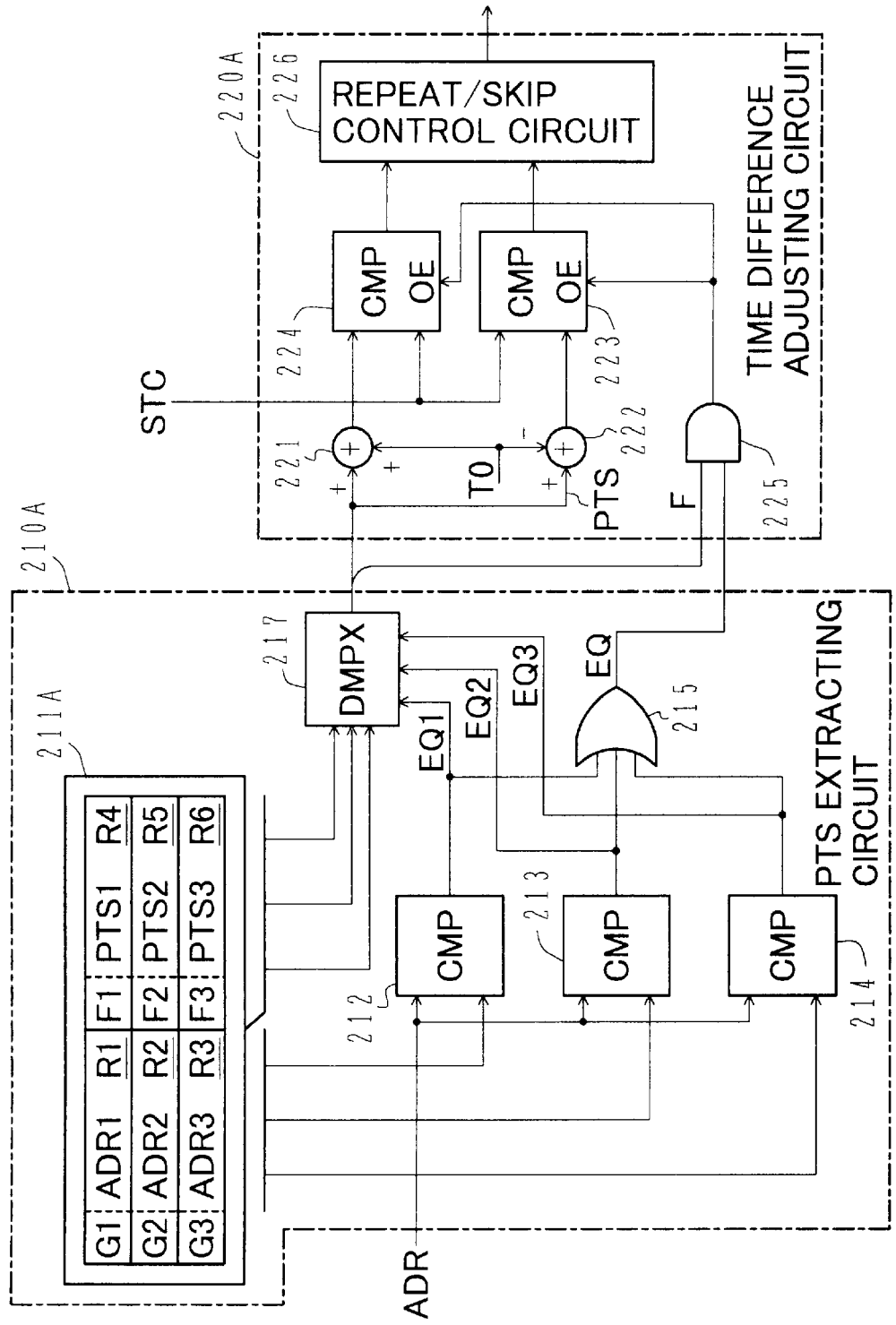
FIG. 4 is a diagram showing structures of a PTS extracting circuit and a time difference adjusting circuit according to a second embodiment of the present invention.

Although the foregoing has described the embodiment in relation to a case where PTS is stored in the memory 23, it is possible to perform similar processing while storing PTS in other three registers. An example of such a structure which corresponds to FIG. 3 is shown in FIG. 4 as the second embodiment. Top boundary address of one picture storage area in this structure is the first address of the picture.

In a PTS extracting circuit 210A, a register circuit 211A comprises registers R1 to R6. The registers R4 to R6 each hold a pair of F and PTS. Outputs from the registers R4 to R6 are provided to a data input of a multiplexer 217, while the outputs EQ1 to EQ3 from the comparator circuits 212 to 214 are provided to a control input of the multiplexer 217. The multiplexer 217 selects an output from the register R4 when the coincident signal EQ1="1," selects an output from the register R5 when the coincident signal EQ2="1," and selects an output from the register R6 when the coincident signal EQ3="1."

In a time difference adjusting circuit 220A, the system time clock STC is provided to one input of the comparator circuits 223 and 224. The output PTS−T0 from the subtracter circuit 222 and the output PTS+T0 from the adder circuit 221 are provided to the other input of the comparator circuits 223 and 224.

Other features are the same as in the first embodiment described above. According to the second embodiment, a shift of PTS from STC is judged at correct timing and erroneous execution of the repeat/skip processing is prevented as in the first preferred embodiment.

What is claimed is:

1. A moving image decoder for decoding encoded image data to obtain decoded image data, temporarily storing said decoded image data into a memory and reading said decoded image data as display decoded image data from said memory in order of original pictures before encoding, comprising:

a first register circuit for temporarily holding a boundary address of a picture storage area within said memory;

a comparator circuit for detecting coincidence of a read address at which said display decoded image data is read with said boundary address;

storage means for storing a presentation time stamp PTS and valid/invalid data in correspondence with said boundary address;

a switching circuit for retrieving said presentation time stamp PTS and said valid/invalid data in response to detection of said coincidence; and a time difference adjusting circuit for performing control which corresponds to a time difference between a system time clock STC and said presentation time stamp PTS retrived by said switching circuit if said valid/invalid data indicates validity.

2. A moving image decoder according to claim 1, wherein said storage means comprises a storage area at said boundary address within said memory.

3. A moving image decoder according to claim 2, wherein said switching circuit comprises a multiplexer which receives data read from said memory, provides the received data as said presentation time stamp PTS and said valid/invalid data from its output when said coincidence is detected, and provides the received data as said display decoded image data from its another output when said coincidence is not detected.

4. A moving image decoder according to claim 1, wherein said storage means comprises a second register circuit, and wherein said boundary address is a top address of a picture within said memory.

5. A moving image decoder according to claim 4, wherein said switching circuit comprises a multiplexer which receives said presentation time stamp PTS and said valid/invalid data read from said second register circuit, and selectively outputs said presentation time stamp PTS and said valid/invalid data which correspond to said coincidence.

6. A moving image decoder according to claim 1, wherein said time difference adjusting circuit outputs a control signal for causing to execute repeating that said display decoded image data of a picture read from said memory last time are read from said memory once again when PTS<STC+T0 where PTS is said presentation time stamp, STC is said system time clock and T0 is a display period for displaying one frame, and said time difference adjusting circuit outputs a control signal for causing to skip said encoded image data to be read from said memory by one frame when PTS<STC−T0.

7. A moving image decoding method for decoding encoded image data to obtain decoded image data, temporarily storing said decoded image data into a memory and reading said decoded image data as display decoded image data from said memory in order of original pictures before encoding, comprising the steps of:

providing a register circuit;

in storing said decoded image data of a picture into said memory, storing a presentation time stamp PTS and valid/invalid data which correspond to said picture at a boundary address of a picture storage area within said memory, and temporarily holding said boundary address into said register circuit;

in sequentially reading said display decoded image data from said memory, detecting coincidence of a read address with said boundary address held in said register circuit; and retriving said data read from said memory as said presentation time stamp PTS and said valid/invalid data when said coincidence has been detected and controlling in correspondence to a time difference between a system time clock STC and said presentation time stamp PTS retrieved if said valid/invalid data indicates validity, and using the retrived data read from said memory as said display decoded image data while said coincidence is not detected.

8. A moving image decoding method for decoding encoded image data to obtain decoded image data, temporarily storing said decoded image data into a memory and reading said decoded image data as display decoded image data from said memory in order of original pictures before encoding, comprising the steps of:

providing a register circuit;

before reading said decoded image data of a picture from said memory, temporarily holding a presentation time stamp PTS and valid/invalid data which correspond to said picture and a boundary address of said picture within said memory into said register circuit;

in sequentially reading said display decoded image data from said memory, detecting coincidence of a read address with said boundary address held in said register circuit; and when said coincidence has been detected, retriving said presentation time stamp PTS and said valid/invalid data which correspond to said coincidence from said register circuit and controlling in correspondence to a time difference between a system time clock STC and said presentation time stamp PTS retrieved if said valid/invalid data indicates validity.

* * * * *

UNITED STATES PATENT AND TRADEMARK OFFICE
CERTIFICATE OF CORRECTION

PATENT NO. : 6,011,869
DATED : January 4, 2000
INVENTOR(S) : Mitsuhiko Ohta, et al.

It is certified that error appears in the above-identified patent and that said Letters Patent is hereby corrected as shown below:

<u>Title page,</u>
Item [73] Assignee: Change "Tokyo" to -- Kawasaki --.

Signed and Sealed this

Second Day of October, 2001

*Attest:*

*Attesting Officer*

NICHOLAS P. GODICI
*Acting Director of the United States Patent and Trademark Office*